(12) United States Patent
Kwon et al.

(10) Patent No.: US 7,512,076 B2
(45) Date of Patent: Mar. 31, 2009

(54) APPARATUS AND METHOD FOR TRANSMITTING REVERSE CHANNEL INFORMATION OF A MOBILE STATION IN A MOBILE COMMUNICATION SYSTEM

(75) Inventors: Hwan-Joon Kwon, Gyeonggi-do (KR); Jung-Soo Jung, Seoul (KR); Ju-Ho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 808 days.

(21) Appl. No.: 11/009,239

(22) Filed: Dec. 10, 2004

(65) Prior Publication Data

US 2005/0128999 A1    Jun. 16, 2005

(30) Foreign Application Priority Data

Dec. 10, 2003    (KR)    ................... 10-2003-0089740

(51) Int. Cl.
  *G06F 11/00*    (2006.01)
  *H04J 3/24*    (2006.01)
  *H04B 7/216*    (2006.01)
(52) U.S. Cl. .............. 370/252; 370/229; 370/342; 370/349; 370/335
(58) Field of Classification Search ......... 370/229–328, 370/335–349
See application file for complete search history.

(56) References Cited

U.S. PATENT DOCUMENTS

| 6,101,388 | A | 8/2000 | Keshavachar |
| 6,188,901 | B1 | 2/2001 | Ebina |
| 2002/0067774 | A1 | 6/2002 | Razoumov et al. |
| 2002/0172217 | A1 | 11/2002 | Kadaba et al. |
| 2003/0039267 | A1 | 2/2003 | Koo et al. |
| 2003/0081572 | A1 | 5/2003 | Kim et al. |
| 2003/0103481 | A1 | 6/2003 | Heo et al. |
| 2003/0142656 | A1 | 7/2003 | Padovani et al. |
| 2005/0201280 | A1* | 9/2005 | Lundby et al. ............... 370/229 |

FOREIGN PATENT DOCUMENTS

| KR | 10200020066255 | 8/2002 |
| WO | WO 01/80445 | 10/2001 |
| WO | WO 02/19563 | 3/2002 |
| WO | WO 02/41509 | 5/2002 |

\* cited by examiner

*Primary Examiner*—Afsar M. Qureshi
(74) *Attorney, Agent, or Firm*—The Farrell Law Firm, PC

(57) ABSTRACT

Disclosed is a method for reporting channel state information between a mobile station and a base station to the base station by the mobile station in a mobile communication system. The method includes the steps of mapping the channel state information to a value stored in a channel state information table. The mapping is determined by a range of traffic-to-pilot ratio (TPR) values. The TPR values are determined according to an encoder packet site packet data rate relation. The mapping is then transmitted to the base station.

17 Claims, 2 Drawing Sheets

APPARATUS AND METHOD FOR TRANSMITTING REVERSE CHANNEL INFORMATION OF A MOBILE STATION IN A MOBILE COMMUNICATION SYSTEM

PRIORITY

This application claims priority under 35 U.S.C. § 119 to an application entitled "Apparatus and Method for Transmitting Reverse Channel Information of Mobile Station in a Mobile Communication System" filed in the Korean Intellectual Property Office on Dec. 10, 2003 and assigned Ser. No. 2003-89740, the contents of which are incorporated herein by reference.

BACKGROUND OF THE INVENTION

1. Field of the Invention

The present invention relates generally to an apparatus and method for transmitting channel information in a mobile communication system, and in particular, to an apparatus and method for transmitting reverse channel information in a mobile communication system.

2. Description of the Related Art

In general, a mobile communication system provides service to a plurality of mobile stations using a scheduling method. The service includes voice and data communication service. The term "scheduling" refers to a process of granting a right to provide a service to a particular mobile station among a plurality of mobile stations according to their priorities or other factors, and determining data rates of services provided to the mobile stations. Because the services are divided into voice and data, the scheduling is performed in different ways for each. For voice service, the scheduling needs only the information on channel and power resources available for the voice service.

However, for data communication or service, the scheduling needs more information because data generally consumes more channel and power resources compared with the voice service. Therefore, to provide data service, the channel state, location, and the priority of a particular mobile station, etc. should be considered.

The data service can be divided into forward data transmission and reverse data transmission according to its transmission direction. The "forward data transmission" refers to data transmission from a base station to a mobile station, and the "reverse data transmission" refers to data transmission from a mobile station to a base station. The forward data transmission and the reverse data transmission need different scheduling information. A description will now be made of information necessary for the forward data transmission and information necessary for the reverse data transmission.

Data transmission in a radio link is achieved through a packet data channel on a per-physical layer packet (PLP) basis. In a system with scheduling, a mobile station gets permission, or a grant, from a base station to transmit packets in the reverse direction. In a particular system, a mobile station may occasionally start reverse data transmission at a lowest possible data rate. However, when the data rate is increased or decreased after the initial transmission, the mobile station can transmit reverse data in response to a grant from a base station, i.e., in response to a control signal from the base station Therefore, the foregoing case in which initial transmission is possible at the lowest data rate will not be considered herein. As described above, when mobile stations want to transmit reverse data, a base station performs scheduling on the mobile stations on a per-transmission time basis to grant or deny reverse packet data transmission. The scheduling information is transmitted to mobile stations by the base station. As a result, only the mobile station receiving the reverse transmission grant from the base station transmits a reverse packet. Although a physical channel over which the mobile station transmits packet data in response to the reverse transmission grant can have different channel names according to systems, it is generally called a "reverse packet data channel (R-PDCH)."

As described above, the base station performs scheduling collectively considering channel conditions and mobile station conditions in a process of granting/disapproving reverse data transmission of mobile stations. Therefore, a scheduler of the base station should have a variety of state information for the mobile stations. For example, the state information includes information on the amount of transmission data stored in a buffer of each mobile station and a reverse channel for each mobile station. Therefore, in a common mobile communication system adopting the scheduling scheme, mobile stations should report (or feed back) the scheduling information to the base station. Although a reverse channel over which the mobile stations feed back the scheduling information to the base station can have different channel names according to systems, it is generally called a "reverse request channel (R-REQCH)."

Table 1 illustrates information transmitted over the R-REQCH in a CDMA2000 Release D system, a North American version of a mobile communication system, by way of example.

TABLE 1

| R-REQCH Information | |
|---|---|
| Field | Number of Bits |
| RESERVED | 1 |
| MAXIMUM_TPR | 4 |
| SR_ID | 3 |
| EVENT | 4 |

The information transmitted over the R-REQCH and the number of bits of the corresponding information, illustrated in Table 1, are subject to change in other systems. In any case, however, in a system adopting the scheduling, mobile stations transmit the similar feedback information to a base station. A description will now be made of the information fields illustrated in Table 1.

(1) RESERVED: A currently undefined bit, and can be used for various purposes in the future.

(2) MAXIMUM_TPR: Information on the reverse channel state of a mobile station, and indicates the maximum TPR that a mobile station can use for R-PDCH. The abbreviation "TPR" stands for a traffic-to-pilot ratio, and refers to a ratio of transmission power of an R-PDCH to transmission power of a pilot channel. In a general mobile communication system, power of mobile stations is controlled by a base station. A description will now be made of a general reverse power control process performed in a mobile communication system.

If a reverse channel of a mobile station is in a bad state, a base station orders the mobile station to increase power of its pilot channel. In contrast, if the reverse channel is in a good state, the base station orders the mobile station to decrease power of its pilot channel. In this way, the base station maintains a reception state of a reverse radio link. In other words, the base station maintains a received reverse signal-to-noise ratio (SNR) for each mobile station in a time-varying reverse radio link. Therefore, it can be considered that a level of pilot transmission power of a mobile station controlled at a particular time indicates a channel state of the corresponding mobile station. For example, assuming that there are a mobile station A and a mobile station B in communication with a base station, if pilot transmission power of the mobile station A is higher than pilot transmission power of the mobile station B at a specific time, it can be regarded that a radio channel of the mobile station B is superior in channel state to a radio channel of the mobile station A.

Commonly, mobile stations are limited in maximum transmission power. For example, if maximum transmission power of a mobile station is limited to 200 mW, it means that possible maximum transmission power of the mobile station at a particular time should not exceed 200 mW. In this situation where the maximum transmission power is limited, if a pilot channel of a mobile station is being power-controlled, power allocable to an R-PDCH by the mobile station at a particular time is changed according to a power level of the pilot channel. That is, it means that the power allocable to an R-PDCH is changed according to whether the pilot channel of the mobile station is in a good state or a bad state. For convenience, it will be assumed herein that physical channels transmitted by mobile stations include only two types of channels: a pilot channel and an R-PDCH. Actually, however, the physical channels transmitted by the mobile stations can include other channels as well.

On this assumption, if a mobile station is being power-controlled by the base station and power allocated to its pilot channel at a particular time is 50 mW, available power allocable to an R-PDCH becomes 200 mW-50 mW=150 mW. In this case, a ratio of maximum power allocable to the R-PDCH by the mobile station to power of the pilot channel is 150 mW/50 mW=3. MAXIMUM_TPR refers to the ratio of maximum power allocable to the R-PDCH by the mobile station to power of the pilot channel. The MAXIMUM_TPR is commonly expressed in dB. The mobile station feeds back information on its reverse channel state by transmitting the MAXIMUM_TPR, i.e., the ratio of maximum power allocable to the R-PDCH to power of the pilot channel, to the base station. Based on the MAXIMUM_TPR received from the mobile station, the base station can determine a reverse channel state of the mobile station, and can also determine a maximum data rate allocable to the mobile station in a scheduling process.

(3) SR_ID: Is a service identifier corresponding to buffer information, indicating the amount of data stored in a buffer, transmitted over an R-REQCH by a mobile station. For example, assuming that a mobile station alternately transmits a packet for a service A and a packet for a service B, if the amount of data stored in a buffer of the mobile station for the service A and the amount of data stored in a buffer for the service B at a particular time are 100 bytes and 300 bytes, respectively, then the mobile station sets the SR_ID to a value corresponding to the service A and writes "100 bytes" in a field indicating the amount of data stored in a buffer before transmission, when feeding back information on the amount of data stored in a buffer for the service A. The service identification information written in the SR_ID can be previously agreed upon with the base station.

(4) EVENT: Indicates the amount of data stored in a buffer, corresponding to the SR_ID.

As described above, in a mobile communication system, a mobile station transmits its reverse channel state information and buffer information to a base station over an R-REQCH, and the base station schedules reverse transmission using the information received from the mobile station.

Table 2 illustrates MAXIMUM_TPR field values and their associated maximum TPRs in a mobile communication system, by way of example.

TABLE 2

MAXIMUM_TPR Field Values

| MAXIMUM_TPR | Maximum TPR on R-PDCH [dB] |
| --- | --- |
| 0000 | TPR < 4 |
| 0001 | 4 ≦ TPR < 5 |
| 0010 | 5 ≦ TPR < 6 |
| 0011 | 6 ≦ TPR < 7 |
| 0100 | 7 ≦ TPR < 8 |
| 0101 | 8 ≦ TPR < 9 |
| 0110 | 9 ≦ TPR < 10 |
| 0111 | 10 ≦ TPR < 11 |
| 1000 | 11 ≦ TPR < 12 |
| 1001 | 12 ≦ TPR < 13 |
| 1010 | 13 ≦ TPR < 14 |
| 1011 | 14 ≦ TPR < 16 |
| 1100 | 16 ≦ TPR < 18 |
| 1101 | 18 ≦ TPR < 20 |
| 1110 | 20 ≦ TPR < 24 |
| 1111 | TPR ≧ 24 |

As can be understood from Table 2, in a CDMA2000 Release D system, MAXIMUM_TPR is expressed using 4 bits. Referring to Table 2, a mobile station transmits '0000' if a TPR value available for an R-PDCH is less dB, transmits '0001' than 4 dB, transmits '0001' if the TPR value falls within a range between 4 dB and 5 dB, and transmits '0010' if the TPR value falls within a range between 5 dB and 6 dB. In this way, the MAXIMUM_TPR values are expressed at 1-dB intervals between '0000' and '1010'. In addition, MAXIMUM_TPR='1011' indicates a range between 14 dB and 16 dB, MAXIMUM_TPR='1100' indicates a range between 16 dB and 18 dB, and MAXIMUM_TPR='1101' indicates a range between 18 dB and 20 dB. Furthermore, MAXIMUM_TPR='1110' indicates a range between 20 dB and 24 dB, and MAXIMUM_TPR='1111' indicates a TPR value larger than or equal to 24 dB. In the foregoing case where the TPR value available for an R-PDCH of a mobile station is expressed with 4 bits, TPR values smaller 14 dB are expressed at 1-dB intervals, and TPR values larger than 14 dB are expressed at 2-dB intervals. In addition, TPR values larger than 20 dB are expressed at 4-dB intervals. Next, with reference to Table 3, a description will be made of TPR values according to encoder packet (EP) sizes used for an R-PDCH in the CDMA2000 Release D system.

TABLE 3

TPR Values

| EP size [bit] | TPR [dB] |
| --- | --- |
| 192 | 0.75 |
| 408 | 3.75 |
| 792 | 6.75 |
| 1560 | 9.625 |
| 3096 | 11.875 |
| 4632 | 13.625 |
| 6168 | 14.875 |
| 9240 | 16.625 |
| 12312 | 18 |
| 15384 | 19.125 |

Table 3 illustrates examples of TPR values used for an R-PDCH in the CDMA2000 Release D system. The phrase "TPR values used for an R-PDCH" refers to TPR values specified to be used for respective packet data rates. For example, in Table 3, a TPR value corresponding to an encoder packet size of 192 is 0.75 dB. When Table 3 is used, a mobile station transmits reverse packets using a frame having a fixed 10-ms length. As a result, encoder packets having 192 bits, 408 bits, . . . , and 15384 bits are transmitted for a 10-ms frame. Therefore, their data rats become 19.2 Kbps, 40.8 Kbps, . . . , and 1.5384 Mbps, respectively. That a TPR value for EP size=192 is 0.75 dB indicates that a TPR value, i.e., a ratio of R-PDCH power to pilot power, used for transmission of 19.2-Kbps packet data by a mobile station is 0.75 dB.

It can be understood from Table 3 that the EP size increases approximately on a double basis from 192 bits to 3096 bits, and increases approximately on a one-and-a-half-times basis at 3096 bits or more. This is because the increase in EP size on a double basis at a large-EP size range reduces a resolution of distribution of the EP sizes. For this reason, the TPR value corresponding to the EP size increases at about 3-dB intervals from 192 bits to 3096 bits, and increases at less-than-2-dB intervals at 3096 bits or more.

Table 2 and Table 3 show the opposite resolution tendencies. That is, in Table 2, TPR values available for an R-PDCH of a mobile station, feedbacked over an R-REQCH, are densely arranged at their smaller values and sparsely arranged at their larger values. In Table 3, TPR values corresponding to EP sizes are sparsely arranged at about 3-dB intervals at their smaller values and densely arranged at their larger values.

Table 4 illustrates a combination of Table 2 and Table 3, i.e., a relation between MAXIMUM_TPR field values, their associated maximum TPRs, and EP sizes.

TABLE 4

Relation Between MAXIMUM TPR, Maximum TPRs and EPS Sizes

| MAXIMUM_TPR | Maximum TPR on R-PDCH [dB] | EP size [bit] |
|---|---|---|
| 0000 | TPR < 4 | 192, 408 |
| 0001 | 4 ≦ TPR < 5 | — |
| 0010 | 5 ≦ TPR < 6 | — |
| 0011 | 6 ≦ TPR < 7 | 792 |
| 0100 | 7 ≦ TPR < 8 | |
| 0101 | 8 ≦ TPR < 9 | |
| 0110 | 9 ≦ TPR < 10 | 1560 |
| 0111 | 10 ≦ TPR < 11 | |
| 1000 | 11 ≦ TPR < 12 | 3096 |
| 1001 | 12 ≦ TPR < 13 | |
| 1010 | 13 ≦ TPR < 14 | 4632 |
| 1011 | 14 ≦ TPR < 16 | 6168 |
| 1100 | 16 ≦ TPR < 18 | 9240 |
| 1101 | 18 ≦ TPR < 20 | 12312, 15384 |
| 1110 | 20 ≦ TPR < 24 | — |
| 1111 | TPR ≧ 24 | — |

In Table 4, the third column represents EP sizes corresponding to TPR ranges indicated by MAXIMUM_TPR values fed back over an R-REQCH. Now, with reference to Table 4, a description will be made of TPR values and their associated EP sizes. MAXIMUM_TPR='1101' on the R-REQCH indicates that a TRP value available for an R-PDCH by a mobile station ranges falls within a range between 18 dB to 20 dB. EP sizes falling within the foregoing range include 12312 and 15384 in Table 3. If a mobile station transmits a MAXIMUM_TPR value to a base station in the foregoing method, the base station preforms scheduling using the feedback information received from the mobile station. In some cases, however, the feedback information includes two or more EP sizes as described above. In this case, the base station cannot correctly determine whether an EP size supportable by the mobile station is 12312 or 15384, causing a possible failure in scheduling. The failure in scheduling reduces the entire transmission throughput of a mobile communication system.

SUMMARY OF THE INVENTION

It is, therefore, an object of the present invention to provide a reverse feedback information transmission apparatus and method for enabling accurate scheduling in a mobile communication system.

It is another object of the present invention to provide a reverse feedback information transmission apparatus and method for increasing the entire transmission efficiency in a mobile communication system.

To achieve the above and other objects, there is provided a mobile station apparatus for generating and transmitting channel state information in a mobile communication system that receives the channel state information between a mobile station and a base station from the mobile station and grants reverse transmission according to the channel state information. The apparatus includes a receiver for receiving a channel state information table transmitted from the base station; a first memory for storing the received channel state information table; a second memory for storing reverse transmission data; a controller for mapping the channel state information to one of values stored in the channel state information table, distinguished by boundary values of traffic-to-pilot ratio (TPR) values determined according to sizes of an encoder packet related to packet data rates of the mobile communication system considering the amount of transmission data stored in the second memory and transmission power thereof, and controlling transmission of the mapping result to the base station; and a transmitter for transmitting the mapped channel state information and the data stored in the second memory to the base station.

To achieve the above and other objects, there is provided a method for reporting channel state information between a mobile station and a base station to the base station by the mobile station in a mobile communication system. The method comprising the steps of mapping the channel state information to one of values stored in a channel state information table, distinguished by boundary values of traffic-to-pilot ratio (TPR) values determined according to sizes of an encoder packet related to packet data rates; and transmitting the mapped channel state information to the base station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
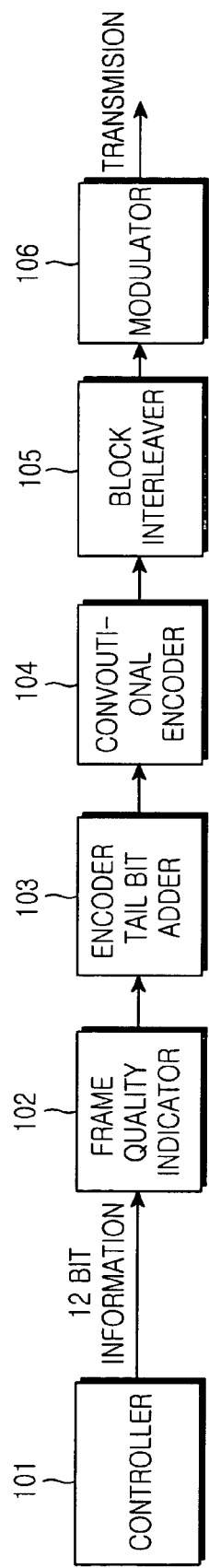
FIG. 1 is a block diagram illustrating a transmitter for transmitting a MAXIMUM_TPR value over an R-REQCH in a mobile station according to an embodiment of the present invention.

A preferred embodiment of the present invention will now be described in detail with reference to the annexed drawings. In the following description, a detailed description of known functions and configurations incorporated herein has been omitted for conciseness.

A method for feeding back reverse channel information, i.e., a MAXIMUM_TPR value, of a mobile station, proposed in the present invention, follows three principles.

First, the present invention follows a resolution tendency of EP sizes in a quantization process of MAXIMUM_TPR. For example, when the EP sizes and their associated TPR values illustrated in Table 3 are provided, the present invention quantizes MAXIMUM_TPR such that the tendency of Table 3 should be satisfied. Referring to Table 3, because EP sizes and their associated TPR values are arranged at about 3-dB intervals within a small-EP size range and arranged at about 2-dB intervals within a large-EP size range, MAXIMUM_TPR is also sparsely quantized at a small-TPR value range and densely quantized at a large-TPR value range, thereby matching its tendency to the tendencies of the EP sizes and their associated TPR values, defined in Table 3.

Second, in the present invention, a TPR value indicated by a MAXIMUM_TPR field value fed back from a mobile station ranges between adjacent TPR values for EP sizes, defined in Table 3. Referring to Table 3, because a TPR value corresponding to EP size=12312 is 18 dB and a TPR value corresponding to the next EP size=15384 is 19.125 dB, a TPR value indicated by a MAXIMUM_TPR field value, for example, '1110', ranges between 18 dB and 19.125 dB. When a mobile station performing quantization in this manner feeds back a MAXIMUM_TPR field value of '1110', a base station can determine that a maximum EP size supportable by the mobile station is 12312.

Third, in the present invention, a TPR value indicated by a MAXIMUM_TPR field value fed back by a mobile station does not indicate a maximum TPR value available for an R-PDCH, but indicates a maximum TPR value supportable by the mobile station, including TPR values for an R-PDCH and an R-SPICH. That is, a TPR value indicated by a MAXIMUM_TPR field value proposed in the present invention is set such that it should become a maximum supportable TPR on (R-PDCH+R-SPICH+R-PDCCH) of a mobile station. This method is efficient especially when TPR values for the R-SPICH and the R-PDCCH are variable according to EP size. Here, the R-SPICH is the abbreviation for a reverse secondary pilot channel, and this channel is used by a mobile station to transmit packets at a high data rate. The R-PDCCH is the abbreviation for a reverse packet data control channel, and this channel is used to transmit control information necessary for demodulation of an R-PDCH which is transmitted together with the R-PDCCH.

The forgoing three principles proposed in the present invention may be applied collectively or selectively.

Table 5 illustrates a preferred embodiment of the present invention, to which the first proposed principle is applied.

TABLE 5

| MAXIMUM_TPR | Maximum TPR on R-PDCH [dB] |
|---|---|
| 0000 | TPR < 3 |
| 0001 | 3 ≦ TPR < 5 |
| 0010 | 5 ≦ TPR < 7 |
| 0011 | 7 ≦ TPR < 9 |
| 0100 | 9 ≦ TPR < 11 |
| 0101 | 11 ≦ TPR < 12 |
| 0110 | 12 ≦ TPR < 13 |
| 0111 | 13 ≦ TPR < 14 |
| 1000 | 14 ≦ TPR < 15 |
| 1001 | 15 ≦ TPR < 16 |
| 1010 | 16 ≦ TPR < 17 |
| 1011 | 17 ≦ TPR < 18 |
| 1100 | 18 ≦ TPR < 19 |
| 1101 | 19 ≦ TPR < 20 |

TABLE 5-continued

| MAXIMUM_TPR | Maximum TPR on R-PDCH [dB] |
|---|---|
| 1110 | 20 ≦ TPR < 21 |
| 1111 | TPR ≧ 21 |

Referring to Table 5, TPR is sparsely quantized at 2-dB intervals at a small-TPR value range and densely quantized at 1-dB intervals at a large-TPR value range, so that its tendency is matched to the tendencies of the EP sizes and their associated TPR values, defined in Table 3.

Next, a description will be made of an embodiment of the present invention, to which the second principle is applied. With reference to Table 6, a description will be made of a method for transmitting MAXIMUM_TPR according to the second principle proposed in the present invention.

TABLE 6

| MAXIMUM_TPR | Maximum TPR on R-PDCH [dB] |
|---|---|
| 0000 | TPR < TPR[ep_size[1]] |
| 0001 | TPR[ep_size[1]] ≦ TPR < TPR[ep_size[2]] |
| 0010 | TPR[ep_size[2]] ≦ TPR < TPR[ep_size[3]] |
| 0011 | TPR[ep_size[3]] ≦ TPR < TPR[ep_size[4]] |
| 0100 | TPR[ep_size[4]] ≦ TPR < TPR[ep_size[5]] |
| 0101 | TPR[ep_size[5]] ≦ TPR < TPR[ep_size[6]] |
| 0110 | TPR[ep_size[6]] ≦ TPR < TPR[ep_size[7]] |
| 0111 | TPR[ep_size[7]] ≦ TPR < TPR[ep_size[8]] |
| 1000 | TPR[ep_size[8]] ≦ TPR < TPR[ep_size[9]] |
| 1001 | TPR[ep_size[9]] ≦ TPR < TPR[ep_size[10]] |
| 1010 | TPR[ep_size[10]] ≦ TPR |
| 1011 | Reserved |
| 1100 | Reserved |
| 1101 | Reserved |
| 1110 | Reserved |
| 1111 | Reserved |

In Table 6, 'ep_size[x]' in 'TPR[ep_size[x]]' represents a TPR value corresponding to an EP size. That is, it means an $x^{th}$ EP size among successive EP sizes, and represents a TPR value for the corresponding EP size. This value is in accordance with Table 3 defining TPR values for EP sizes. In Table 6, ep_size[1], ep_size[2], ep_size[3], ep_size[4], . . . , and ep_size[10] represent 192, 408, 792, 1560, . . . , and 15384, respectively, and can be an arrangement representing EP sizes. For example, because TPR[ep_size[1]] in Table 6 corresponds to a first EP size in Table 3, it becomes a TPR value corresponding to EP size=192. That is, the TPR value is 0.75 dB. The reason why '1011'~'1111' are unused in Table 6 is because the invention is applied to the CDMA2000 Release D system in which the EP sizes are divided into 10 groups. For example, in a system where the EP sizes are divided into 11 groups, '1010' represents 'TPR[ep_size[10]]≦TPR<TPR[ep_size[11]]', and '1011' represent 'TPR[ep_size[11]]≦ TPR'.

Next, a description will be made of an embodiment of the present invention, to which the third principle is applied. With reference to Table 7, a description will be made of a method for mapping MAXIMUM_TPR according to the third principle proposed in the present invention, and reporting the mapping result to a base station.

TABLE 7

| MAXIMUM_TPR | Maximum TPR on R-PDCH [dB] |
|---|---|
| 0000 | TPR < TPR[ep_size[1]] |
| 0001 | TPR[ep_size[1]] ≦ TPR < TPR[ep_size[1]] + 0.5(TPR[ep_size[2]] − TPR[ep_size[1]]) |

TABLE 7-continued

| MAXIMUM_TPR | Maximum TPR on R-PDCH [dB] |
|---|---|
| 0010 | TPR[ep_size[1]] + 0.5(TPR[ep_size[2]] − TPR[ep_size[1]] ≦ TPR < TPR[ep_size[2]] |
| 0011 | TPR[ep_size[2]] ≦ TPR < TPR[ep_size[2]] + 0.5(TPR[ep_size[3]] − TPR[ep_size[2]]) |
| 0100 | TPR [ep_size[2]] + 0.5(TPR[ep_size[3]] − TPR[ep_size[2]] ≦ TPR < TPR[ep_size[3]] |
| 0101 | TPR[ep_size[3]] ≦ TPR < TPR[ep_size[3]] + 0.5(TPR[ep_size[4]] − TPR[ep_size[3]]) |
| 0110 | TPR[ep_size[3]] + 0.5(TPR[ep_size[4]] − TPR[ep_size[3]] ≦ TPR < TPR[ep_size[4]] |
| 0111 | TPR[ep_size[4] ≦ TPR < TPR[ep_size[4]] + 0.5(TPR[ep_size[5]] − TPR[ep_size[4]]) |
| 1000 | TPR[ep_size[4]] + 0.5(TPR[ep_size[5]] − TPR[ep_size[4]] ≦ TPR < TPR[ep_size[5]] |
| 1001 | TPR[ep_size[5]] ≦ TPR < TPR[ep_size[5]] + 0.5(TPR[ep_size[6]] − TPR[ep_size[5]]) |
| 1010 | TPR[ep_size[5]] + 0.5(TPR[ep_size[6]] − TPR[ep_size[5]] ≦ TPR < TPR[ep_size[6]] |
| 1011 | TPR[ep_size[6]] ≦ TPR < TPR[ep_size[7]] |
| 1100 | TPR[ep_size[7]] ≦ TPR < TPR[ep_size[8]] |
| 1101 | TPR[ep_size[8]] ≦ TPR < TPR[ep_size[9]] |
| 1110 | TPR[ep_size[9]] ≦ TPR < TPR[ep_size[10]] |
| 1111 | TPR[ep_size[10]] ≦ TPR |

In Table 7, the TPR is more finely quantized at a small-TPR value range in order to use '1011'~'1111' unused in Table 6.

Now, a description will be made of a structure of a transmitter for transmitting a MAXIMUM_TPR value reported from a mobile station to a base station over an R-REQCH according to an embodiment of the present invention.

FIG. 1 is a block diagram illustrating a transmitter for transmitting a MAXIMUM_TPR value over an R-REQCH in a mobile station according to an embodiment of the present invention. The transmitter illustrated in FIG. 1 is similar in structure to a general transmitter using a convolutional code. The transmitter includes a controller 101, a frame quality indicator 102, an encoder tail bit adder 103, a convolutional encoder 104, a block interleaver 105, and a modulator 106.

In operation, 12-bit information output from the controller 101 is provided to the frame quality indicator 102. The reason why the information is comprised of 12 bits is because it is assumed herein that the information is transmitted over an R-REQCH defined in Table 1. The number of bits constituting the information is subject to change according to channel type. The information includes MAXIMUM_TPR values defined in Table 5 to Table 7 according to an embodiment of the present invention. That is, the 12-bit information includes MAXIMUM_TPR values satisfying at least one of the 3 principles proposed in the present invention.

The frame quality indicator 102 adds an error detection code, e.g., cyclic redundancy check (CRC) code, to the 12-bit information, and outputs the CRC-added information to the encoder tail bit adder 103. The encoder tail bit adder 103 adds encoder tail bits for convergence into a specific state to the input information, and outputs the encoder tail-added information to the convolutional encoder 104. The convolutional encoder 104 convolutional-encodes the encoder tail-added information, and outputs the convolution-encoded information to the block interleaver 105. The block interleaver 105 interleaves the convolution-encoded information, and outputs the interleaved information to the modulator 106. The modulator 106 modulates the interleaved information and transmits the modulated information in the reverse direction.

Figure 2:
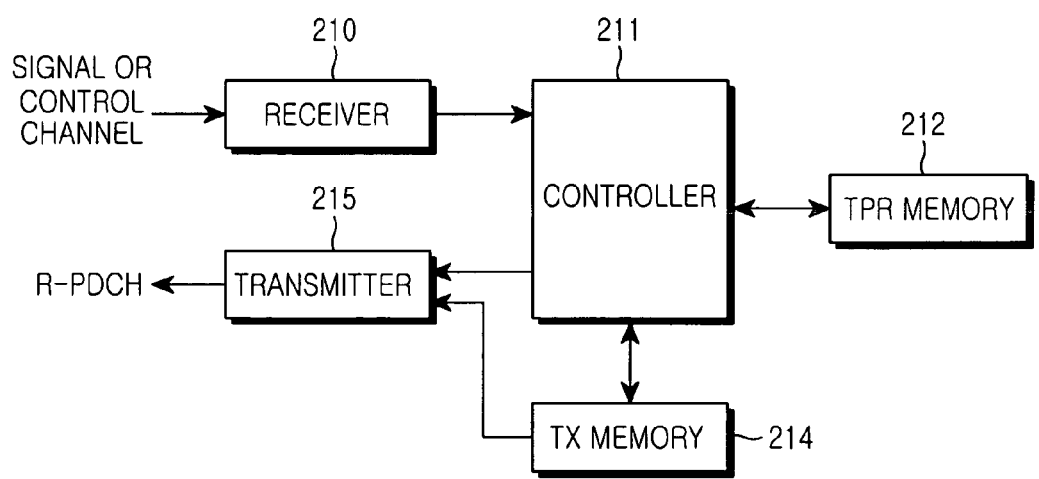
FIG. 2 is a block diagram illustrating a mobile station for transmitting a MAXIMUM_TPR value according to an embodiment of the present invention.

FIG. 2 is a block diagram illustrating a mobile station for transmitting a MAXIMUM_TPR value according to an embodiment of the present invention. With reference to FIG. 2, a description will now be made of a structure and operation for transmitting a MAXIMUM_TPR value according to an embodiment of the present invention.

Referring to FIG. 2, a controller 211 is similar in structure to the controller 101 of FIG. 1. The other elements 102 to 106 of FIG. 1 are included in a transmitter 215. The transmitter 215 further includes a radio frequency (RF) processor (not shown).

During initial communication, the mobile station receives a TPR table defined in Table 5 to Table 7 over a signaling channel or a predetermined control channel. Although the table can be previously stored in the mobile station, it will be assumed herein that the table is transmitted from a base station to a mobile station. Upon receiving the table defined in the present invention, a receiver 210 down-converts, demodulates and decodes the received table information, and outputs the result to the controller 211. The controller 211 stores the received table information in a TPR memory 212. The stored table can include the values created in accordance with Table 5, Table 6, and/or Table 7.

In accordance with an alternative embodiment, the table described above may be formed using any one or more of the three principles defined in the present invention. If the table is generated in this way, it will change.

In a process of transmitting reverse data, the controller 211 detects the amount of data stored in a transmission memory 214, and calculates a ratio of traffic power available for reverse transmission. This ratio becomes a TPR value as described previously. If the TPR value corresponds to any one of the TPR values stored in the TPR memory 212, the controller 211 generates a message to be transmitted over the R-REQCH illustrated in Table 1 using the corresponding TPR value. The transmitter 215 transmits the generated message in the reverse direction. In this manner, the mobile station can more correctly transmit scheduling information to a base station.

As can be understood from the foregoing description, the mobile station forms a MAXIMUM_TPR table according to an embodiment of the present invention, thereby transmitting more appropriate scheduling information in the reverse direction. In this way, the entire efficiency of the system can be increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for reporting available power information of a Mobile Station (MS) to a Base Station (BS) in a mobile communication system, the method comprising the steps of:

mapping a Traffic-to-Pilot Ratio (TPR) to an index in an information table including a plurality of indexes, the TPR being a ratio of transmission power of a reverse vacket data channel to transmission power of a pilot channel; and transmitting the index to the BS, wherein the indexes identify ranges of TPR values corresponding to racket sizes of packets that can be transmitted in a reverse direction from the MS to the BS.

2. The method of claim 1, wherein the information table is received from the BS over a signaling channel during initial communication.

3. The method of claim 1, wherein the information table is defined as

| | |
|---|---|
| 0000 | TPR < TPR[ep_size[1]] |
| 0001 | TPR[ep_size[1]] ≦ TPR < TPR[ep_size[2]] |
| 0010 | TPR[ep_size[2]] ≦ TPR < TPR[ep_size[3]] |
| 0011 | TPR[ep_size[3]] ≦ TPR < TPR[ep_size[4]] |
| 0100 | TPR[ep_size[4]] ≦ TPR < TPR[ep_size[5]] |
| 0101 | TPR[ep_size[5]] ≦ TPR < TPR[ep_size[6]] |
| 0110 | TPR[ep_size[6]] ≦ TPR < TPR[ep_size[7]] |
| 0111 | TPR[ep_size[7]] ≦ TPR < TPR[ep_size[8]] |
| 1000 | TPR[ep_size[8]] ≦ TPR < TPR[ep_size[9]] |
| 1001 | TPR[ep_size[9]] ≦ TPR < TPR[ep_size[10]] |
| 1010 | TPR[ep_size[10]] ≦ TPR |
| 1011 | Reserved |
| 1100 | Reserved |
| 1101 | Reserved |
| 1110 | Reserved |
| 1111 | Reserved | wherein a left column of the information table comnrises the plurality of indexes, a right column comprises the ranges of the TPR values, and ep size represents an encoded packet size.

4. The method of claim 1, further comprising the steps of:
receiving a grant message for controlling MS transmission on a reverse channel; and
transmitting a packet to the BS if the grant message shows allowance.

5. The method of claim 1, wherein the traffic of TPR includes the transmission power of the reverse packet data channel and power of at least one other channel.

6. The method of claim 5, wherein the at least one other channel is one of a packet data control channel (PDCCH) and a secondary pilot channel (SPICH).

7. A method for generating an information table and providing the information table to a mobile station by a base station in a mobile communication system that receives information between the mobile station and the base station from the mobile station and grants reverse transmission according to the information, the method comprising the steps of:
quantizing information into a specific range of traffic-to-pilot ratio (TPR) values, the specific range corresponding to an encoder packet size of packets that can be transmitted in the reverse direction in a mobile communication system, and forming an information table as a function of the quantized range, the TPR being a ratio of transmission power of a reverse packet data channel to transmission power of a pilot channel; and
transmitting the information table to the mobile station, the information table for mapping TPR values to indexes.

8. The method of claim 7, wherein the information table is defined as

| | |
|---|---|
| 0000 | TPR < TPR[ep_size[1]] |
| 0001 | TPR[ep_size[1]] ≦ TPR < TPR[ep_size[2]] |
| 0010 | TPR[ep_size[2]] ≦ TPR < TPR[ep_size[3]] |
| 0011 | TPR[ep_size[3]] ≦ TPR < TPR[ep_size[4]] |
| 0100 | TPR[ep_size[4]] ≦ TPR < TPR[ep_size[5]] |
| 0101 | TPR[ep_size[5]] ≦ TPR < TPR[ep_size[6]] |
| 0110 | TPR[ep_size[6]] ≦ TPR < TPR[ep_size[7]] |
| 0111 | TPR[ep_size[7]] ≦ TPR < TPR[ep_size[8]] |
| 1000 | TPR[ep_size[8]] ≦ TPR < TPR[ep_size[9]] |
| 1001 | TPR[ep_size[9]] ≦ TPR < TPR[ep_size[10]] |
| 1010 | TPR[ep_size[10]] ≦ TPR |

-continued

| | |
|---|---|
| 1011 | Reserved |
| 1100 | Reserved |
| 1101 | Reserved |
| 1110 | Reserved |
| 1111 | Reserved | wherein a left column of the information table comprises the plurality of indexes, a right column comprises the ranges of TPR values, and ep size represents an encoded packet size.

9. The method of claim 8, wherein the information table is transmitted over a signaling channel.

10. The method of claim 7, further comprising the steps of:
quantizing the TPR values according to the packet sizes provided in the mobile communication System; and
quantizing TPR values for a data channel and another channel, corresponding to the quantized TPR values;
wherein the information table is formed by mapping the quantized values to TPR values corresponding to the packet sizes.

11. The method of claim 10, wherein the information table is transmitted over a signaling channel.

12. The method of claim 10, wherein the another channel is one of a packet data control channel (PDCCH) and a secondary pilot channel (SPICH).

13. A mobile station apparatus for reporting available power information of the mobile station to a base station in a mobile communication system, the apparatus comprising:
a controller for mapping a Traffic-to-Pilot Ratio (TPR) to an index in an information table including a plurality of indexes, the TPR being a ratio of transmission power of a reverse packet data channel to transmission power of a pilot channel; and
a transmitter for transmitting the index to the base Station,
wherein the indexes identify ranges of TPR values corresponding to packet sizes of packets that can be transmitted in a reverse direction from the mobile station to the base station.

14. The mobile station apparatus of claim 13, further comprising:
a receiver for receiving the information table transmitted from the base station;
a first memory for storing the received information table; and
a second memory for storing reverse transmission data;
wherein the
a transmitter transmits the data stored in the second memory to the base station.

15. The mobile station apparatus of claim 14, wherein the information table is received from the base station over a signaling channel during initial communication.

16. The mobile station apparatus of claim 13, wherein traffic of the TPR includes the transmission power of the reverse packet data channel and power of at least one other channel.

17. The mobile station apparatus of claim 16, wherein the at least one other channel is one of a packet data control channel(PDCCH) and secondary pilot channel(SPICH).

* * * * *